(12) United States Patent
Bissonnette et al.

(10) Patent No.: US 6,571,875 B2
(45) Date of Patent: Jun. 3, 2003

(54) CIRCULATION TOOL FOR USE IN GRAVEL PACKING OF WELLBORES

(75) Inventors: Harold S. Bissonnette, Sugar Land, TX (US); Jake A. Danos, Stafford, TX (US); Mehmet Parlar, Sugar Land, TX (US); Colin J. Price-Smith, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 19 days.

(21) Appl. No.: 09/782,701

(22) Filed: Feb. 13, 2001

(65) Prior Publication Data

US 2001/0047867 A1 Dec. 6, 2001

Related U.S. Application Data

(60) Provisional application No. 60/183,200, filed on Feb. 17, 2000.

(51) Int. Cl.⁷ .............................................. E21B 43/04
(52) U.S. Cl. ........................ 166/278; 166/51; 166/318; 166/332.4
(58) Field of Search ...................... 166/278, 51, 332.4, 166/318

(56) References Cited

U.S. PATENT DOCUMENTS

| | | | | |
|---|---|---|---|---|
| 4,018,284 A | * | 4/1977 | Perkins | 166/205 |
| 4,246,968 A | * | 1/1981 | Jessup et al. | 166/317 |
| 4,450,912 A | | 5/1984 | Callihan et al. | |
| 4,499,951 A | | 2/1985 | Vann | |
| 5,024,273 A | | 6/1991 | Coone et al. | |
| 5,174,379 A | | 12/1992 | Whiteley et al. | |
| 5,332,038 A | * | 7/1994 | Elton et al. | 297/238 |
| 5,609,204 A | | 3/1997 | Rebardi et al. | |
| 5,931,229 A | | 8/1999 | Lehr et al. | 166/278 |
| 6,140,277 A | | 10/2000 | Tibbles et al. | 507/201 |

FOREIGN PATENT DOCUMENTS

GB  2 341 876  3/2000 ............. C09K/7/00

* cited by examiner

*Primary Examiner*—Hoang Dang
(74) *Attorney, Agent, or Firm*—Williams, Morgan & Amerson P.C; Jeffrey Griffin; Brigitte Jeffery

(57) ABSTRACT

A circulation tool includes a housing having a longitudinal bore therethrough, a wall, and at least one lateral port through the housing wall and at least two sliding sleeves. At least one circulation flow passage is disposed within the housing wall. A plurality of circulation paths are created by the selective positioning of the at least two sliding sleeves.

46 Claims, 5 Drawing Sheets

CIRCULATION TOOL FOR USE IN GRAVEL PACKING OF WELLBORES

This application claims priority from U.S. Provisional Patent Application No. 60/183,200 filed on Feb. 17, 2000.

BACKGROUND OF THE INVENTION

1. Field of the Invention

This invention relates generally to tools used to complete subterranean wells and more particularly provides an apparatus for use in gravel pack operations.

2. Description of Related Art

Hydrocarbon fluids such as oil and natural gas are obtained from a subterranean geologic formation, i.e., a reservoir, by drilling a well that penetrates the hydrocarbon-bearing formation. Once a wellbore has been drilled, the well must be completed before hydrocarbons can be produced from the well. A completion involves the design, selection, and installation of equipment and materials in or around the wellbore for conveying, pumping, or controlling the production or injection of fluids. After the well has been completed, production of oil and gas can begin.

Sand or silt flowing into the wellbore from unconsolidated formations can lead to an accumulation of fill within the wellbore, reduced production rates and damage to subsurface production equipment. Due to its highly abrasive nature, sand contained within production streams can result in the erosion of tubing, flowlines, valves and processing equipment. The problems caused by sand production can significantly increase operational and maintenance expenses and can lead to a total loss of the well. One means of controlling sand production is the placement of relatively large sand (i.e., "gravel") around the exterior of a slotted, perforated, or other type liner or screen. The gravel prevents the fine sand from packing off around the production tubing and screen, and the screen prevents the gravel from entering the production tubing. It is important to size the gravel for proper containment of the formation sand, and the screen must be designed in a manner to prevent the flow of the gravel through the screen.

In open hole completions that are gravel packed, a drilling fluid residue is left on the formation adjacent to the borehole in the form of a filter cake. Filter cake removal treatments are conventionally done through coiled tubing after gravel packing. This necessitates the pulling of the gravel pack assembly out of the well and running in the well with coiled tubing for filter cake removal or to spot post gravel pack fluids such as breakers, acids or corrosion inhibitors. The final production/injection tubing is then run in the well after the coiled tubing is removed. The ability to perform the steps of gravel packing, filter cake removal operations and post gravel pack fluid spotting on a single trip would save significant time and expense.

SUMMARY OF THE INVENTION

The present invention comprises an apparatus for use in gravel packing operations in wellbores. Some embodiments of the invention enable the running in, washing down, gravel packing, reversing excess slurry, and the spotting of post gravel pack fluids on a single trip.

One embodiment of the invention comprises a housing having an exterior and a longitudinal bore extending therethrough, and a lateral port providing a communication path between the housing longitudinal bore and the exterior of the housing. A first sleeve is disposed within the housing longitudinal bore that has a longitudinal passageway therethrough and is capable of being positioned in an upper position and a lower position relative to the housing. First and second lateral passageways extend through the wall of the first sleeve. A second sleeve is disposed within the first sleeve and also has a longitudinal passageway therethrough. The second sleeve is capable of being positioned in an upper position and a lower position relative to the first sleeve. A first flow passage extends longitudinally through the housing and a second flow passage extends longitudinally through the housing. When the first sleeve is in the upper position, and the second sleeve is in the lower position, communication is established between the longitudinal bore of the housing above the second sleeve and the exterior of the housing, and communication is established between the longitudinal bore of the housing below the second sleeve and the first flow passage. When the first sleeve is in the lower position, communication is established between the longitudinal bore of the housing above the first sleeve and the second flow passage.

The apparatus can have the first and second sleeves releasably secured in their upper positions with retaining elements. The retaining elements can be of a shear element design.

The first and second sleeves can comprise ball seating elements, where the ball seating element of the second sleeve has a smaller diameter than the ball seating element of the first sleeve. The apparatus can further comprise a first ball that can be sized so as to pass through the first sleeve, and to seat within the second sleeve. When the first sleeve is in the upper position and the first ball is seated within the second sleeve, the first ball can form a primary seal that restricts communication between the longitudinal bore of the housing above the second sleeve and the longitudinal bore of the housing below the second sleeve. The invention can further comprise a second ball that is sized so as to seat within the first sleeve. When the first sleeve is in the upper position and the second ball is seated within the first sleeve, the second ball forms a seal that restricts communication between the longitudinal bore of the housing above the second ball and the longitudinal bore below the second ball.

The first sleeve can be in sliding contact with the housing and the second sleeve can be in sliding contact with the first sleeve.

When both the first and second sleeves are in the upper position, the second sleeve prevents communication between the longitudinal bore of the housing and the first lateral passageway. When the second sleeve is in the lower position, a secondary seal can be formed by contact of the second sleeve with the first sleeve that restricts communication between the longitudinal bore of the housing above the second sleeve and the longitudinal bore of the housing below the second sleeve. This secondary seal can comprise an elastomeric sealing element, which can be an O-ring element, for example.

When the first lateral passageway is aligned with the lateral port, communication is established between the longitudinal bore of the housing above the second sleeve and the exterior of the housing, and communication is established between the longitudinal bore of the housing below the second sleeve and the first flow passage.

When the first sleeve is in the lower position, the second lateral passageway is aligned with the second flow passage and communication is established between the longitudinal bore of the housing above the first sleeve and the second flow passage. This can also establish communication between the longitudinal bore of the housing above the first sleeve and the longitudinal bore of the housing below the second sleeve through the second flow passage. When the first sleeve is in the lower position, the first sleeve restricts communication between the longitudinal bore of the housing and the lateral port and can also restrict communication between the longitudinal bore of the housing and the first flow passage.

The apparatus can be connected to a gravel pack screen element, to a packer element, and to a tubing string, each having a longitudinal bore. These tubulars can be located inside a wellbore, wherein an annular space is formed between the tubing and the wellbore. Communication can be established between the longitudinal bore of the tubing and the longitudinal bore of the gravel pack screen element.

An alternate embodiment of the present invention comprises a cylindrical housing having an exterior and a longitudinal bore and a lateral port communicating between the housing longitudinal bore and the exterior of the housing. A first sleeve is disposed within the housing longitudinal bore and in sliding contact with the housing, having a longitudinal passageway and a ball seating element. It is capable of being positioned in an upper position and a lower position relative to the housing and can have a first and second lateral passageways extending through the wall of the first sleeve. A second sleeve can be disposed within the longitudinal bore of the first sleeve, in sliding contact with the first sleeve and have a longitudinal passageway and a ball seating element. It can be capable of being positioned in an upper position and a lower position relative to the first sleeve. The embodiment can have a first flow passage extending longitudinally through the housing and a second flow passage extending longitudinally through the housing. A first ball is sized so as to pass through the first sleeve, and to seat within the second sleeve and a second ball is sized so as to seat within the first sleeve. The ball seating element of the second sleeve has a smaller diameter than the ball seating element of the first sleeve. When the first sleeve is in the upper position and the second sleeve is in the upper position, communication is established between the longitudinal bore of the housing above the sleeves and the longitudinal bore of the housing below the sleeves. The first lateral passageway is prevented by the second sleeve. When the first sleeve is in the upper position and the second sleeve is in the lower position, the first lateral passageway is aligned with the lateral port and communication is established between the longitudinal bore of the housing above the second sleeve and the exterior of the housing through the lateral port and communication is established between the longitudinal bore of the housing below the second sleeve and the first flow passage. When the first sleeve is in the lower position, the second lateral passageway is aligned with the second flow passage and communication is established between the longitudinal bore of the housing above the sleeves and the longitudinal bore of the housing below the sleeves through the second flow passage, communication between the longitudinal bore of the housing and the exterior of the housing through the lateral port is prevented by the first sleeve, and communication through the first flow passage is prevented by the first sleeve.

The apparatus can be located above and connected to a gravel pack screen element having a longitudinal bore and the apparatus can be located below and connected to a packer element having a longitudinal bore. The packer element can be connected to a tubing string having a longitudinal bore and the packer element inserted inside a wellbore, thereby forming an annular space between the tubing and the wellbore.

When the first sleeve is in the upper position and the second sleeve is in the lower position, the first lateral passageway is aligned with the lateral port and communication is established between the longitudinal bore of the housing above the second sleeve and the exterior of the housing through the lateral port and communication is established between the longitudinal bore of the housing below the second sleeve and the annular space above the packer element through the first flow passage.

When the first sleeve is in the lower position, the second lateral passageway is aligned with the second flow passage and communication is established between the longitudinal bore of the housing above the sleeves and the longitudinal bore of the housing below the sleeves through the second flow passage, communication between the longitudinal bore of the housing and the exterior of the housing through the lateral port is prevented by the first sleeve and communication between the longitudinal bore of the housing and the annular space above the packer through the first flow passage is prevented by the first sleeve.

The apparatus can further comprise a third lateral passageway through the first sleeve wherein when the first sleeve is in the upper position communication is established between the longitudinal bore of the housing below the sleeves and the first flow passage through the third lateral passageway. When the third lateral passageway is aligned with the first flow passage, communication is established between the longitudinal bore of the housing below the sleeves and the annular space above the packer element through the first flow passage.

A further embodiment of the invention includes an apparatus comprising a cylindrical housing having an exterior and a longitudinal bore and a lateral port communicating between the housing longitudinal bore and the exterior of the housing. A first sleeve can be disposed within the housing longitudinal bore, having a cylindrical wall and a longitudinal passageway therethrough, capable of being positioned in an upper position and a lower position relative to the housing. First and second lateral passageways can extend through the wall of the first sleeve. A second sleeve can be disposed within the first sleeve, having a longitudinal passageway and capable of being positioned in an upper position and a lower position relative to the first sleeve. A third sleeve can be disposed within the first sleeve, having a longitudinal passageway therethrough and capable of being positioned in an upper position and a lower position relative to the first sleeve. A first flow passage can extend longitudinally through the housing and a second flow passage can also extend longitudinally through the housing. When the first sleeve is in the upper position and the second sleeve is in the lower position, communication can be established between the longitudinal bore of the housing above the second sleeve and the exterior of the housing and communication can be established between the longitudinal bore of the housing below the second sleeve and the first flow passage. When the first sleeve is in the lower position and the third sleeve is in its lower position, communication is established between the longitudinal bore of the housing above the third sleeve and the second flow passage.

When the third sleeve is in its upper position, communication is restricted through the second lateral passageway. When the third sleeve is in its lower position, communication is possible through the second lateral passageway. The second and third sleeves can comprise ball seating elements. The ball seating element of the second sleeve can have a smaller diameter than the ball seating element of the third sleeve. The apparatus can further comprise a first ball that is sized so as to pass through the third sleeve and to seat within the second sleeve, and a second ball that is sized so as to seat within the third sleeve. When the first sleeve is in the upper position and the first ball is seated within the second sleeve, the first ball forms a primary seal that restricts communication between the longitudinal bore of the housing above the second sleeve and the longitudinal bore of the housing below the second sleeve.

The third sleeve can be in sliding contact with the first sleeve. The first and third sleeves can be releasably secured in their upper positions with at least one retaining element. When the first sleeve is in the upper position and the second sleeve is in the upper position, the second sleeve prevents communication between the longitudinal bore of the housing and the first lateral passageway.

Yet another embodiment of the invention comprises a circulation tool having a housing with a longitudinal bore, a wall, and at least one lateral port through the housing wall. It can include at least two sliding sleeves, at least one flow passage within the housing wall and a plurality of circulation paths that can be created by the selective positioning of the sliding sleeves.

The circulation tool can comprise a first sleeve movable between an upper position and a lower position and a second sleeve movable between an upper position and a lower position. The second sleeve is capable of being shifted into its lower position independent of the movement of the first sleeve.

When the first and second sleeve are in their upper position, fluid communication is established through the longitudinal bore of the tool and restricted through the lateral port through the housing wall, creating a standard circulation path.

When the second sleeve is in its lower position and the first sleeve is in its upper position, fluid communication is established between the longitudinal bore of the housing above the second sleeve and the lateral port through the housing wall. Fluid communication is also established between the longitudinal bore of the housing below the second sleeve and the first flow passage, creating a gravel pack circulation path.

When the second sleeve is in its lower position, the first sleeve in its lower position, and the third sleeve is in its lower position, fluid communication is restricted between the longitudinal bore of the housing above the first sleeve and the lateral port through the housing wall. Fluid communication is established between the longitudinal bore of the housing above the first sleeve and the second flow passage. Fluid communication is also established between the longitudinal bore of the housing below the second sleeve and one of the flow passages within the housing wall, creating a modified standard circulation path.

Another aspect of the present invention consists of a method of completing a subterranean well that comprises tubing and an annulus between the wellbore and the tubing. The method comprises providing a device as described above and positioning the device within a wellbore wherein the first sleeve is in the upper position and the second sleeve is in the upper position. The device is reconfigured so that the second sleeve is in the lower position, allowing communication between the longitudinal bore of the housing and the exterior of the housing. The device is reconfigured so that the first sleeve is in the lower position, allowing circulation through the tubing and device and up the tubing/wellbore annulus.

This method can further comprise using a first ball to reposition the second sleeve from the upper position to the lower position. A second ball can be used to reposition the first sleeve from the upper position to the lower position. The method can further comprise attaching a gravel pack screen assembly below the device and a packer element above the device prior to positioning the device within the wellbore. A gravel laden slurry can be flowed through the lateral port when the first sleeve is in the upper position and the second sleeve is in the lower position, thereby depositing the gravel in the annulus adjacent the gravel pack screen assembly. The device can be released from the gravel pack screen assembly after the gravel laden slurry is placed and the wellbore circulated through the tubing and the device after the first sleeve is in the lower position to place fluids at desired locations within the wellbore.

An alternate embodiment of the invention includes a wellbore completion method comprising providing a circulation tool as described above, positioning the tool within the wellbore, thereby creating a tool-wellbore annulus. The tool is initially configured to provide a first circulation path, the first circulation path being through the tool and the tool-wellbore annulus. The tool can then be reconfigured to provide circulation through the lateral port to provide a second circulation path. The tool can then be reconfigured to seal off the lateral port and provide a third circulation path through the tool and the tool-wellbore annulus. The tool can be reconfigured from the first circulation path to the second circulation path utilizing a first ball and from the second circulation path to the third circulation path utilizing a second ball, the balls sized to seat within the sliding sleeves. The method can further comprise attaching a gravel pack screen assembly to the tool. A gravel laden slurry can be flowed through the second circulation path, thereby depositing gravel within the wellbore outside of the gravel pack screen assembly. Fluids can then be circulated within the wellbore through the third circulation path, following the depositing of gravel outside of the gravel pack screen assembly.

An alternate embodiment of the invention is a well completion method performed in a single trip into a well. The method comprises inserting a service tool into the well to a desired location, gravel packing the well, and circulating fluids within the wellbore through the service tool to dislodge and remove filter cake residue. The gravel packing can comprise flowing a gravel laden slurry through the service tool, thereby selectively depositing gravel within the well. The service tool can define multiple, selectable flow paths through which fluids and slurries can flow. When the service tool is inserted into the well it can be in a first flow path configuration that allows circulation through the service tool. Once the service tool has been inserted to the desired location, the service tool can be reconfigured to a second flow path configuration to enable the gravel packing of the well. After the well has been gravel packed, the service tool can be reconfigured to a third flow path configuration to enable the circulation of fluids within the wellbore, through the service tool, to dislodge and remove filter cake residue. After the circulation of fluids to dislodge and remove filter cake residue, specialty fluids can be spotted at selected locations within the well.

Yet another embodiment is a method of completing a subterranean well performed in a single trip into a wellbore. This method comprises running a service tool into the well, the service tool defining multiple, selectable flow paths and the gravel packing of the well. A different flow path of the service tool is selected followed by the removing of a filter cake from the wellbore by circulating a fluid through the service tool. Specialty fluids are spotted within the wellbore at desired locations prior to the removing of the service string from the well. The gravel packing of the well can comprise flowing a gravel laden slurry through the service tool, thereby selectively depositing gravel within the wellbore. The service tool can be inserted into the well in a first flow path configuration allowing fluid circulation through the service tool. When the service tool has been inserted to the desired location, the service tool can be reconfigured to a second flow path configuration to enable the gravel packing of the well.

In still another embodiment a well completion method performed in a single trip into a well is disclosed. This method comprises inserting a service tool into the well to a desired location and gravel packing the well with a fluid that contains at least one breaker for filtercake removal. Fluids are then circulated or injected within the well through the service tool to displace the breakers away from predetermined downhole equipment. The service tool can be inserted into the well in a first flow path configuration allowing fluid circulation through the service tool. When the service tool has been inserted to the desired location, the service tool can be reconfigured to a second flow path configuration to enable the gravel packing of the well. Once the gravel packing of the well has been performed, the service tool is capable of being reconfigured to a third flow path configuration to enable the circulating of fluids through the service tool.

DESCRIPTION OF ILLUSTRATIVE EMBODIMENTS

Figure 1:
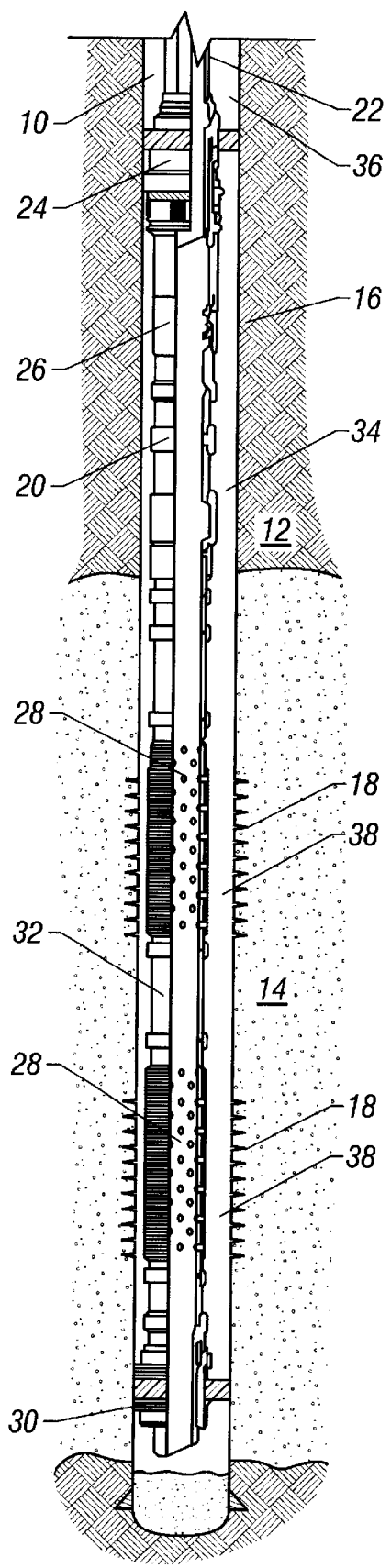
FIG. 1 is a cross section view of a typical gravel pack wellbore completion.

Referring to the attached drawings, FIG. 1 illustrates a wellbore 10 that has penetrated a subterranean zone 12 that includes a productive formation 14. The wellbore 10 has a casing 16 that has been cemented in place. The casing 16 has a plurality of perforations 18 which allow fluid communication between the wellbore 10 and the productive formation 14. A well tool 20 is positioned within the casing 16 in a position adjacent to the productive formation 14, which is to be gravel packed.

The well tool 20 comprises a tubular member 22 attached to a production packer 24, a cross-over 26, one or more screen elements 28 and optionally a lower packer 30. Blank sections 32 of pipe may be used to properly space the relative positions of each of the components. An annulus area 34 is created between each of the components and the wellbore casing 16. The combination of the well tool 20 and the tubular string extending from the well tool to the surface can be referred to as the production string.

In a gravel pack operation the packer elements 24, 30 are set to ensure a seal between the tubular member 22 and the casing 16. Gravel laden slurry is pumped down the tubular member 22, exits the tubular member through ports in the cross-over 26 and enters the annulus area 34. In one typical embodiment the particulate matter (gravel) in the slurry has an average particle size between about 40/60 mesh–12/20 mesh, although other sizes may be used. Slurry dehydration occurs when the carrier fluid leaves the slurry. The carrier fluid can leave the slurry by way of the perforations 18 and enter the formation 14. The carrier fluid can also leave the slurry by way of the screen elements 28 and enter the tubular member 22. The carrier fluid flows up through the tubular member 22 until the cross-over 26 places it in the annulus area 36 above the production packer 24 where it can leave the wellbore 10 at the surface. Upon slurry dehydration the gravel grains should pack tightly together. The final gravel filled annulus area is referred to as a gravel pack. The annular areas 38 adjacent to the screen elements 28 are locations of particular need for tightly packed gravel placement.

As used herein, the term "screen" refers to wire wrapped screens, mechanical type screens and other filtering mechanisms typically employed with sand screens. Sand screens need to be have openings small enough to restrict gravel flow, often having gaps in the 60–120 mesh range, but other sizes may be used. The screen element 28 can be referred to as a sand screen. Screens of various types are produced by US Filter/Johnson Screen, among others, and are commonly known to those skilled in the art.

It is often desirable to spot fluids within the wellbore after a gravel pack completion. These fluids may be corrosion inhibitors placed in the wellbore for the protection of certain components, especially if the well will not be produced until a later time. Another common requirement is to spot breakers across the producing formation. These breakers will assist in the cleaning and removal of the filter cake residue that is left on the formation face. The removal of the filter cake is required if the full productive capacity of the producing formation is to be obtained. Typically, once the gravel pack operation is completed, the work string is removed from the well and a string of coiled tubing is run into the well. The fluids are spotted and possibly the wellbore is circulated to remove any completion contaminants or filter cake residue. The coiled tubing is then removed from the well and the production tubing is run into the well.

The apparatus allows normal tubing-annulus circulation as the gravel pack assembly is run into the well. This initial circulation is sometimes needed if the wellbore has any fill, requiring the circulation of the wellbore to wash the fill out. This is known as washing the gravel pack assembly down the well.

Once the assembly is in the proper location, the tool is reconfigured to allow circulation from the tubing to be directed to the annulus area 34 adjacent to the sand screens 28. The carrier fluid from the gravel pack slurry is able to pass through the sand screens 28 into the bore of the well tool 22 where it travels upwards until it is redirected to the annulus area 36 above the packer 24 and can be circulated out of the wellbore 10.

After the gravel pack operation is finished, the apparatus is reconfigured to close off the crossover ports 26 and allow the circulation of the tubing and annulus through the well tool 22. The packer 24 can be released and the well tool 22 disengaged from the sand screen assembly, in this way the wellbore can be circulated and fluids spotted during the same trip in the hole as the gravel pack operation.

FIGS. 2A–E illustrate one embodiment of the present invention in its different configurations.

Figure 2A:
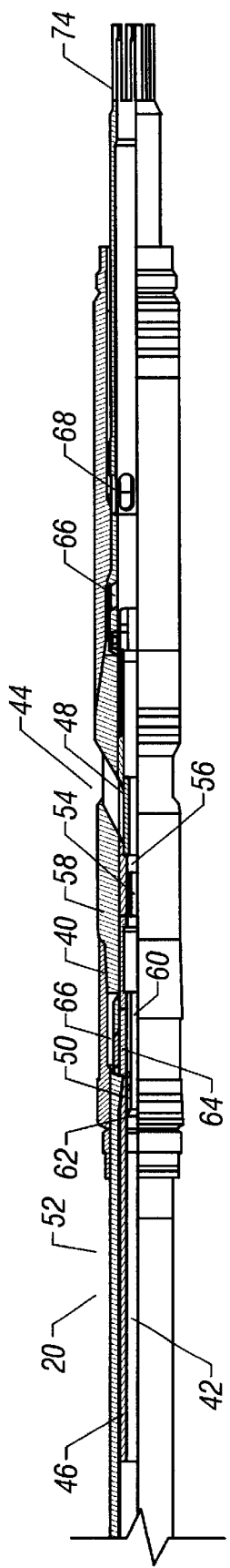
FIGS. 2A–E illustrate one embodiment of the present invention in its different configurations.

The initial configuration that is used for running into the wellbore 10, and for washing down if necessary, is shown in FIG. 2A. The present invention is shown generally as a well tool 20 comprising a housing 40 having a longitudinal bore 42 and a lateral port 44 through its wall. A first sleeve 46 is disposed within the housing 40 and is in sliding contact with the housing 40. It is capable of being in an upper and lower position relative to the housing 40. In FIG. 2A, the first sleeve 46 is shown in its upper position. The first sleeve 46 contains a first lateral passageway 48 that is aligned with the lateral port 44 when the first sleeve 46 is in its upper position. The first sleeve 46 also comprises a second lateral passageway 50 and can be releasably secured in the upper position by a first sleeve retaining element 52.

A second sleeve 54 is disposed within the first sleeve 46 and contains a ball seating element 56. The second sleeve 54 is in sliding contact with the first sleeve 46 and is movable between an upper position and a lower position relative to the first sleeve 46. In FIG. 2A the second sleeve is shown in its upper position. The second sleeve 54 can contain a retaining element 58 that secures the second sleeve 54 in its upper position. In its upper position the second sleeve 54 blocks off the fluid communication through the lateral port 44 and the first lateral passageway 48.

A third sleeve 60 is disposed within the first sleeve 46 and contains a ball seating element 62. The third sleeve 60 is in sliding contact with the first sleeve 46 and is movable between an upper position and a lower position relative to the first sleeve 46. The third sleeve 60 can contain a retaining element 64 that releasably secures the third sleeve 60 in its upper position. In its upper position the third sleeve 60 blocks off the fluid flow through the second lateral passageway 50.

The retaining elements 52, 58, 64, used to secure the sleeves in the initial upper positions can take the form of a shear element that will break upon a known force being exerted and release the sleeve which it retains. They could likewise take the form of a retaining spring or any other retaining element that is releasable. Numerous different designs are known in the art.

A first flow passage 66 is located within the housing 40 and provides fluid communication between the longitudinal bore 42 below the lateral port 44 and the exterior of the housing 40 above the lateral port 44.

A second flow passage 68 is located within the housing 40 and provides fluid communication between the longitudinal bore 42 below the lateral port 44 and the exterior of the housing 40 below the lateral port 44.

A ported collet 74 is shown at the end of the well tool 20 and is used to prevent the first sleeve from sliding back to its original position. Other methods of connecting the tool 20 with other attachments can work equally as well.

In the initial configuration as shown in FIG. 2A, fluid can flow through the longitudinal bore of the housing 42 and through any attachments such as a gravel pack screen assembly. The fluid can then be returned through the annulus area between the well tool 20 and the wellbore wall or casing.

Figure 2B:
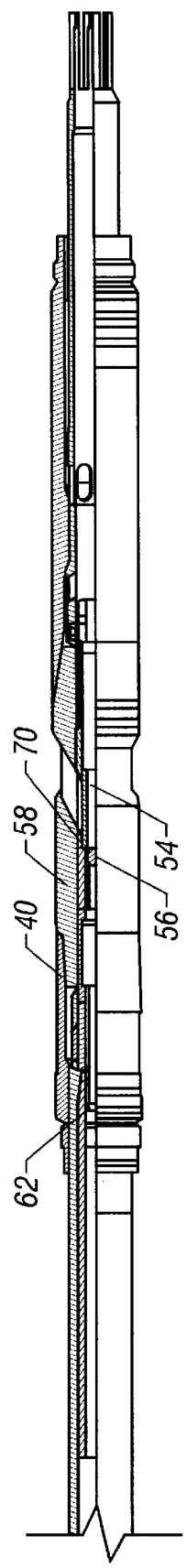

FIG. 2B shows the embodiment of the invention as in FIG. 2A with the addition of a first ball 70 that is sized to pass through the third sleeve ball seating element 62 and seat in the second sleeve ball seating element 56. In this configuration, fluid communication through the longitudinal bore 42 of the tool 20 is restricted. An increase in pressure above the first ball 70 will apply force onto the second sleeve retaining element 58. If sufficient force is applied to overcome the second sleeve retaining element 58, then the second sleeve 54 can move from its upper position to its lower position.

Balls used in conjunction with ball seating elements are well known and widely used in the art. When referring to a ball seating "in" or "within" a ball seating element, it is meant that the ball and ball seating element form a seating or sealing relationship that will restrict fluid flow through the bore of the ball seating element. This term is not meant to mean that the ball need be totally enclosed within the seating element. The ball may and typically will be partially enclosed within the ball seating element. The illustration shown in FIG. 2D is where the second ball 72 is seated with the first sleeve ball seating element 78.

Figure 2C:
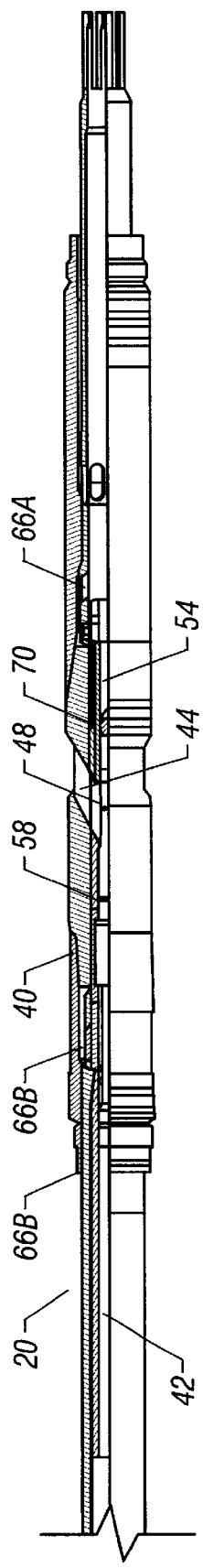

FIG. 2C shows the second sleeve 54 shifted into its lower position after the release of the second sleeve retaining element 58. The second sleeve 54 is no longer blocking passage through the lateral port 44 and the first lateral passageway 48. The first ball 70 that is seated in the second sleeve 54 is restricting fluid flow through the longitudinal bore 42. In this configuration fluid will pass down the longitudinal bore 42 of the tool 20, will pass through the first lateral passageway 48 of the first sleeve 46 and through the lateral port 44 of the housing 40. The fluid will then flow down the outside of the tool 20 and return up the longitudinal bore 42 of the tool 20 until it reaches the first flow passage 66. As shown in FIG. 2C, the fluid will enter the first flow passage 66a below the second sleeve 54 and will exit the first flow passage 66b above the lateral port 44 and on the outside of the tool 20 above the packer 24. This configuration is used to perform a gravel pack operation to deposit gravel in the annulus area adjacent a screen element (as shown in FIG. 1).

After the gravel pack operation is complete, it is desired to reconfigure the tool and regain the ability to circulate in the normal tubing-annulus path. The present invention permits this reconfiguration and it is illustrated in FIGS. 2D and 2E.

Figure 2D:
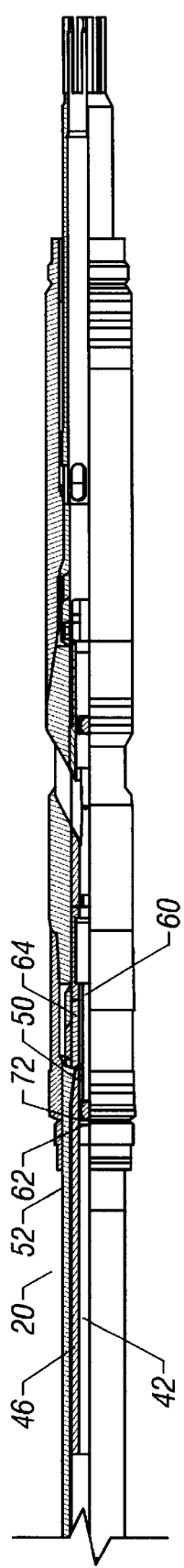

As shown in FIG. 2D, a second ball 72 is inserted within the longitudinal bore 42. The second ball 72 seats within the ball seating element 62 of the third sleeve 60. In this configuration, fluid communication through the longitudinal bore 42 of the tool 20 is restricted. An increase in pressure above the second ball 72 will apply force onto the third sleeve retaining element 64. If sufficient force is applied to overcome the third sleeve retaining element 64, then the third sleeve 60 can move from its upper position to its lower position. When the third sleeve 60 is in its lower position, it no longer blocks flow through the second lateral passageway 50 in the first sleeve 46. The second ball 72 seated within the ball seating element 62 of the third sleeve 60 will continue to restrict flow through the longitudinal bore 42. No communication through the second lateral passageway 50 can be obtained while the first sleeve 46 is in its upper position, since the second lateral passageway is not aligned with any of the flow passages. Additional pressure exerted on the longitudinal bore 42 above the second ball 72 will apply force onto the first sleeve retaining element 52. If sufficient force is applied to overcome the first sleeve retaining element 52, then the first sleeve 46 can move from its upper position to its lower position. This sequence of shifting the third sleeve 60 prior to shifting the first sleeve 46 can be reversed and the first sleeve 46 can be shifted prior to the shifting of the third sleeve 60.

Figure 2E:
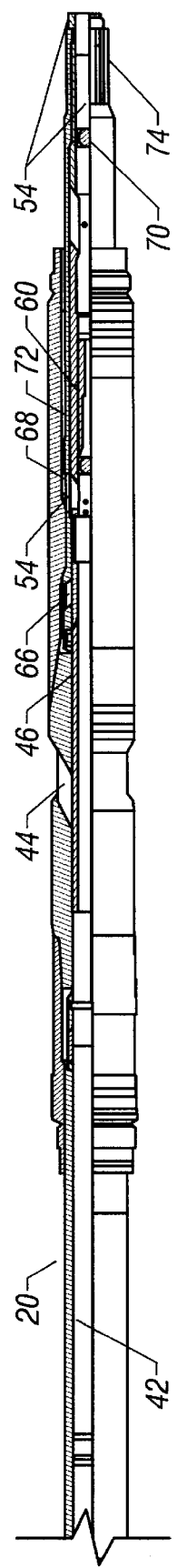

FIG. 2E shows the tool 20 in the final configuration having all three sleeves 46, 54, 60 in their lower positions. In this configuration, the first sleeve 46 blocks the lateral port 44 and the first flow passage 66. The second lateral passageway 50 is aligned with the second flow passage 68 providing communication between the longitudinal bore 42 above the second ball 72 and the longitudinal bore 42 below the first ball 70. This configuration allows the circulation of fluid down the longitudinal bore 42, around the first ball 70 and second ball 72 by way of the second flow passage 68, and down through any other attachments to the well tool 20. The final shifting of the first sleeve 46 into its lower position can result in the projection of a portion of the second sleeve 54 through the ported collet 74. Once all three sleeves 46, 54, 60 are in their lower positions, the wellbore can be circulated, breakers and other fluids spotted, and the well tool 20 pulled from the well.

FIGS. 3A–E illustrate an alternate embodiment of the present invention in its different configurations.

Figure 3A:
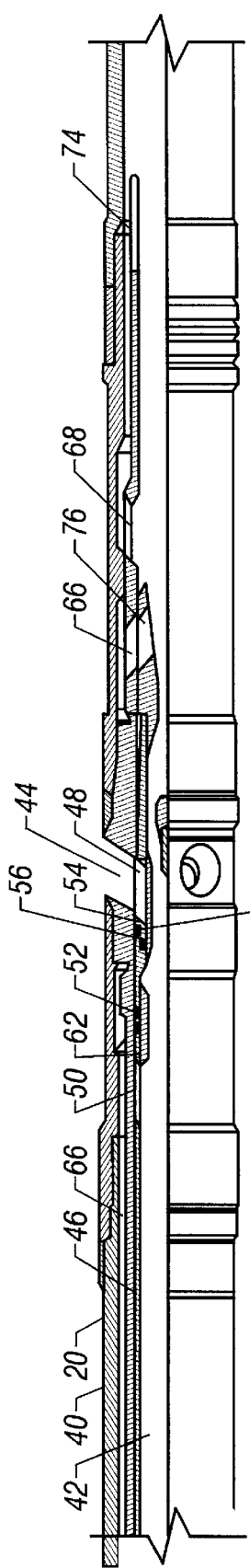
FIGS. 3A–E illustrate an alternate embodiment of the present invention in its different configurations.

The initial configuration that is used for running into the wellbore 10, and for washing down if necessary, is shown in FIG. 3A. The present invention is shown generally as a well tool 20 comprising a housing 40 having a longitudinal bore 42 and a lateral port 44 through its wall. A first sleeve 46 is disposed within the housing 40 and is in sliding contact with the housing 40. It is capable of being in an upper and lower position relative to the housing 40 and comprises a ball seating element 78. In FIG. 3A, the first sleeve 46 is shown in its upper position. The first sleeve 46 contains a first lateral passageway 48 that is aligned with the lateral port 44 when the first sleeve 46 is in its upper position. The first sleeve 46 also comprises a second lateral passageway 50 and can be secured in the upper position by a first sleeve retaining element 52. In the embodiment shown the first sleeve 46 also comprises a third lateral passageway 76, that is initially aligned with the first flow passage 66.

A second sleeve 54 is disposed within the first sleeve 46 and contains a ball seating element 56. The second sleeve 54 is in sliding contact with the first sleeve 46 and is movable between an upper position and a lower position relative to the first sleeve 46. In FIG. 3A the second sleeve is shown in its upper position. The second sleeve 54 can contain a retaining element 58 that releasably secures the second sleeve 54 in its upper position. In its upper position the second sleeve 54 blocks off the fluid communication through the lateral port 44 and the first lateral passageway 48.

The retaining elements 52, 58 used to secure the sleeves in the initial upper positions can take the form of a shear element that will break upon a known force being exerted and release the sleeve which it retains. They could likewise take the form of a retaining spring or any other retaining element that is releasable. Numerous different designs are known in the art.

A first flow passage 66 is located within the housing 40 and provides fluid communication between the longitudinal bore 42 below the lateral port 44 and the exterior of the housing 40 above the lateral port 44.

A second flow passage 68 is located within the housing 40 and provides fluid communication between the longitudinal bore 42 below the lateral port 44 and the exterior of the housing 40 below the lateral port 44.

A ported collet 74 is shown at the end of the well tool 20 and can be used to connect the tool 20 to other attachments, such as a gravel pack screen assembly. Other methods of connecting the tool 20 with other attachments can work equally as well.

In the initial configuration as shown in FIG. 3A, fluid can flow through the longitudinal bore of the housing 42 and through any attachments such as a gravel pack screen assembly. The fluid can then be returned through the annulus area between the well tool 20 and the wellbore wall or casing.

Figure 3B:
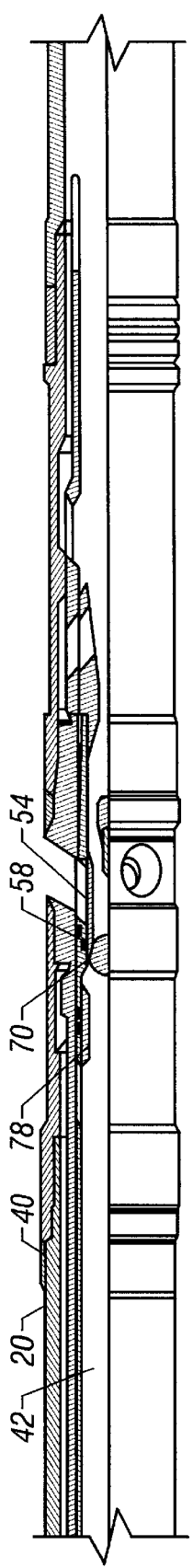

FIG. 3B shows the embodiment of the invention as in FIG. 3A with the addition of a first ball 70 that is sized to pass through the first sleeve ball seating element 78 and seat in the second sleeve ball seating element 56. In this configuration, fluid communication through the longitudinal bore 42 of the tool 20 is restricted. An increase in pressure above the first ball 70 will apply force onto the second sleeve retaining element 58. If sufficient force is applied to overcome the second sleeve retaining element 58, then the second sleeve 54 can move from its upper position to its lower position.

Figure 3C:
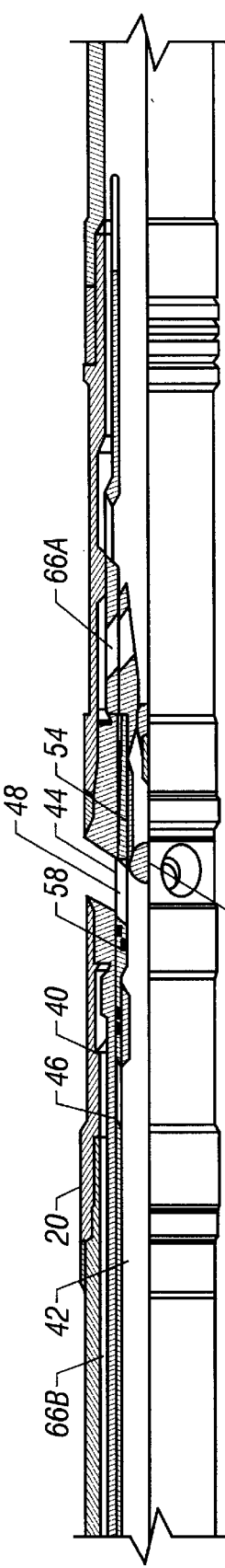

FIG. 3C shows the second sleeve 54 shifted into its lower position after the release of the second sleeve retaining element 58. The second sleeve 54 is no longer blocking passage through the lateral port 44 and the first lateral passageway 48. The first ball 70 that is seated in the second sleeve 54 is restricting fluid flow through the longitudinal bore 42. In this configuration fluid will pass down the longitudinal bore 42 of the tool 20, will pass through the first lateral passageway 48 of the first sleeve 46 and through the lateral port 44 of the housing 40. The fluid will then flow down the outside of the tool 20 and return up the longitudinal bore 42 of the tool 20 until it reaches the first flow passage 66. As shown in FIG. 3C, the fluid will enter the first flow passage 66a below the second sleeve 54 and will flow through the first flow passage 66b above the lateral port 44 and can be exited on the outside of the tool 20. This configuration is used to perform a gravel pack operation to deposit gravel in the annulus area adjacent a screen element (as shown in FIG. 1).

The gravel pack carrier fluid can comprise acids, oxidizers and other breakers or specialty fluids that may be useful in the completion of a productive formation, such as in removal of a filtercake. U.S. Pat. No. 6,140,277 discloses well completion fluids and methods that can be used to remove wellbore damage and near-wellbore damage such as filtercake removal. When these breakers are used as the carrier fluid for the gravel pack, they often need to be displaced or completely removed from the well due to their potentially corrosive nature. This would especially be of concern where these fluids are located adjacent to downhole equipment that could be damaged by the corrosive action of the fluids. The term filtercake is meant to refer to the wellbore damage and near-wellbore damage in the form of a coating formed from drilling and production related operations.

After the gravel pack operation is complete it is desired to reconfigure the tool and regain the ability to circulate in the normal tubing-annulus manner. The present invention permits this and is illustrated in FIGS. 3D and 3E.

Figure 3D:
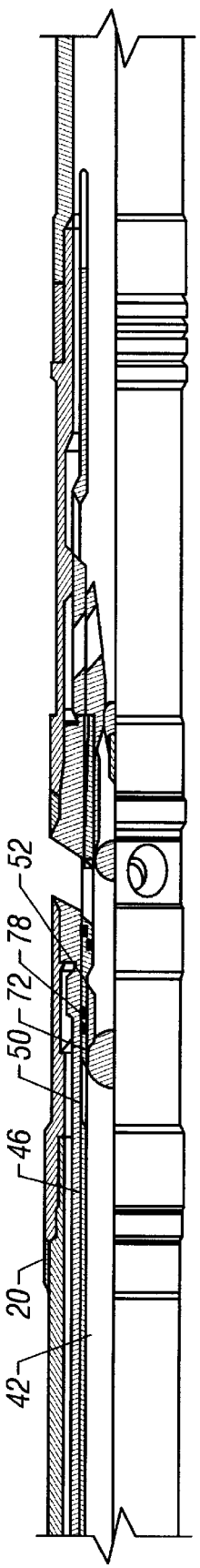

As shown in FIG. 3D, a second ball 72 is inserted within the longitudinal bore 42. The second ball 72 seats within the ball seating element 78 of the first sleeve 46. In this configuration, fluid communication through the longitudinal bore 42 of the tool 20 is restricted. An increase in pressure above the second ball 72 will apply force onto the first sleeve retaining element 52. If sufficient force is applied to overcome the first sleeve retaining element 52, then the first sleeve 46 can move from its upper position to its lower position.

Figure 3E:
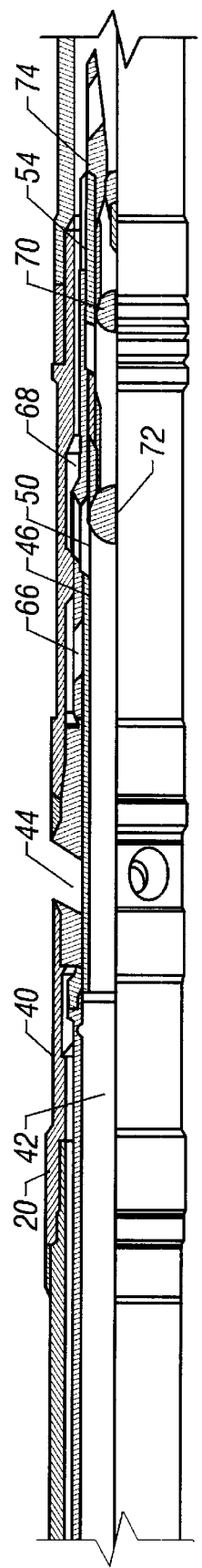

FIG. 3E shows the tool 20 in the final configuration having both first sleeve 46 and second sleeve 54 in their lower positions. In this configuration, the first sleeve 46 blocks the lateral port 44 and the first flow passage 66. The second lateral passageway 50 is aligned with the second flow passage 68 providing communication between the longitudinal bore 42 above the second ball 72 and the longitudinal bore 42 below the first ball 70. This configuration allows the circulation of fluid down the longitudinal bore 42, around the first ball 70 and second ball 72 by way of the second flow passage 68, and down through any other attachments to the well tool 20. The final shifting of the first sleeve 46 into its lower position can result in the projection of a portion of the first sleeve 46 through the ported collet 74, which can release the well tool 20 from other attachments, such as the gravel pack screen assembly. Once released from the lower attachments the wellbore can be circulated, specialty fluids such as breakers, acids or corrosion inhibitors can be spotted. Spotting fluids is a term used to describe the placement of fluids in desired locations within the wellbore or adjacent to specific well tools. The well tool 20 can then be pulled from the well.

The discussion and illustrations within this application refer to a vertical wellbore that has casing cemented in place and comprises casing perforations to enable communication between the wellbore and the productive formation. The present invention can also be utilized to complete wells that are not cased and likewise to wellbores that have an orientation that is deviated from vertical.

The particular embodiments disclosed herein are illustrative only, as the invention may be modified and practiced in different but equivalent manners apparent to those skilled in the art having the benefit of the teachings herein. Furthermore, no limitations are intended to the details of construction, operation, materials of construction or design herein shown, other than as described in the claims below. It is therefore evident that the particular embodiments disclosed above may be altered or modified and all such variations are considered within the scope and spirit of the invention. Accordingly, the invention is therefore to be limited only by the scope of the following claims.

What is claimed is:

1. An apparatus comprising:
    a cylindrical housing having an exterior and a longitudinal bore extending therethrough;
    a lateral port communicating between the housing longitudinal bore and the exterior of the housing;
    a first sleeve disposed within the housing longitudinal bore and having a cylindrical wall and a longitudinal passageway therethrough, capable of being positioned in an upper position and a lower position relative to the housing;
    first and second lateral passageways extending through the wall of the first sleeve;
    a second sleeve disposed within the first sleeve and having a longitudinal passageway therethrough and capable of being positioned in an upper position and a lower position relative to the first sleeve;
    a first flow passage extending longitudinally through the housing; and
    a second flow passage extending longitudinally through the housing;
    wherein when the first sleeve is in the upper position, and the second sleeve is in the lower position, communication is established between the longitudinal bore of the housing above the second sleeve and the exterior of the housing, and communication is established between the longitudinal bore of the housing below the second sleeve and the first flow passage;
    wherein when the first sleeve is in the lower position, communication is established between the longitudinal bore of the housing above the first sleeve and the second flow passage.

2. The apparatus of claim 1, wherein the first sleeve and the second sleeve are secured in their upper positions with retaining elements.

3. The apparatus of claim 2, wherein the first and second sleeves comprise ball seating elements.

4. The apparatus of claim 3, wherein the ball seating element of the second sleeve has a smaller diameter than the ball seating element of the first sleeve.

5. The apparatus of claim 2, wherein the retaining elements comprise a shear element.

6. The apparatus of claim 1, wherein when the first sleeve is in the upper position, and the second sleeve is in the upper position, the second sleeve prevents communication between the longitudinal bore of the housing and the first lateral passageway.

7. The apparatus of claim 1, further comprising a first ball that is sized so as to pass through the first sleeve, and to seat within the second sleeve.

8. The apparatus of claim 7, wherein when the first sleeve is in the upper position, and the first ball is seated within the second sleeve, the first ball forms a primary seal that restricts communication between the longitudinal bore of the housing above the second sleeve and the longitudinal bore of the housing below the second sleeve.

9. The apparatus of claim 8, wherein when the second sleeve is in the lower position, a secondary seal is formed by contact of the second sleeve with the first sleeve that restricts communication between the longitudinal bore of the housing above the second sleeve and the longitudinal bore of the housing below the second sleeve.

10. The apparatus of claim 9, wherein the secondary seal further comprises an elastomeric sealing element.

11. The apparatus of claim 10, wherein the elastomeric sealing element comprises an O-ring element.

12. The apparatus of claim 9, wherein when the first lateral passageway is aligned with the lateral port, communication is established between the longitudinal bore of the housing above the second sleeve and the exterior of the housing, and communication is established between the longitudinal bore of the housing below the second sleeve and the first flow passage.

13. The apparatus of claim 7, further comprising a second ball that is sized so as to seat within the first sleeve.

14. The apparatus of claim 13, wherein when the first sleeve is in the upper position, and the second ball is seated within the first sleeve, the second ball forms a seal that restricts communication between the longitudinal bore of the housing above the second ball and longitudinal bore below the second ball.

15. The apparatus of claim 14, wherein when the first sleeve is in the lower position, the second lateral passageway is aligned with the second flow passage, and communication is established between the longitudinal bore of the housing above the first sleeve and the second flow passage.

16. The apparatus of claim 15, wherein communication is established between the longitudinal bore of the housing above the first sleeve and the longitudinal bore of the housing below the second sleeve through the second flow passage.

17. The apparatus of claim 15, wherein when the first sleeve is in the lower position, the first sleeve restricts communication between the longitudinal bore of the housing and the lateral port.

18. The apparatus of claim 15, wherein when the first sleeve is in the lower position, the first sleeve restricts communication between the longitudinal bore of the housing and the first flow passage.

19. The apparatus of claim 1, wherein the apparatus is connected to a gravel pack screen element having a longitudinal bore therethrough.

20. The apparatus of claim 19, wherein the apparatus is connected to a packer element having a longitudinal bore therethrough, and the packer element is connected to a tubing string having a longitudinal bore therethrough, and the packer element is located inside a wellbore, and wherein an annular space is formed between the tubing and the wellbore.

21. The apparatus of claim 20, wherein communication is established between the longitudinal bore of the tubing and the longitudinal bore of the gravel pack screen element.

22. The apparatus of claim 1, wherein when the first sleeve is in the lower position, the first sleeve restricts communication between the longitudinal bore of the housing and the lateral port and restricts communication between the longitudinal bore of the housing and the first flow passage.

23. The apparatus of claim 1, wherein the first sleeve is in sliding contact with the housing.

24. The apparatus of claim 1, wherein the second sleeve is in sliding contact with the first sleeve.

25. The apparatus of claim 1, further comprising a third lateral passageway through the first sleeve, wherein when the first sleeve is in the upper position, communication is established between the longitudinal bore of the housing below the sleeves and the first flow passage through the third lateral passageway.

26. The apparatus of claim 25, wherein when the third lateral passageway is aligned with the first flow passage, communication is established between the longitudinal bore of the housing below the sleeves and an annular space above a packer element through the first flow passage.

27. An apparatus comprising:
a cylindrical housing having an exterior and a longitudinal bore extending therethrough;
a lateral port communicating between the housing longitudinal bore and the exterior of the housing;
a first sleeve disposed within the housing longitudinal bore and in sliding contact with the housing, and having a longitudinal passageway therethrough and a ball seating element, capable of being positioned in an upper position and a lower position relative to the housing;
first and second lateral passageways extending through the wall of the first sleeve;
a second sleeve disposed within the longitudinal bore of the first sleeve and in sliding contact with the first sleeve, and having a longitudinal passageway therethrough and a ball seating element, and capable of being positioned in an upper position and a lower position relative to the first sleeve;
a first flow passage extending longitudinally through the housing;
a second flow passage extending longitudinally through the housing;
a first ball that is sized so as to pass through the first sleeve, and to seat within the second sleeve;
a second ball that is sized so as to seat within the first sleeve;
wherein the ball seating element of the second sleeve has a smaller diameter than the ball seating element of the first sleeve;
wherein when the first sleeve is in the upper position, and the second sleeve is in the upper position, communication is established between the longitudinal bore of the housing above the sleeves and the longitudinal bore of the housing below the sleeves, and communication between the longitudinal bore of the housing and the exterior of the housing through the lateral port and through the first lateral passageway is prevented by the second sleeve;
wherein when the first sleeve is in the upper position, and the second sleeve is in the lower position, the first lateral passageway is aligned with the lateral port and communication is established between the longitudinal bore of the housing above the second sleeve and the exterior of the housing through the lateral port, and communication is established between the longitudinal bore of the housing below the second sleeve and the first flow passage; and
wherein when the first sleeve is in the lower position, the second lateral passageway is aligned with the second flow passage and communication is established between the longitudinal bore of the housing above the sleeves and the longitudinal bore of the housing below the sleeves through the second flow passage, and communication between the longitudinal bore of the housing and the exterior of the housing through the lateral port is prevented by the first sleeve, and communication through the first flow passage is prevented by the first sleeve.

28. The apparatus of claim 27, wherein the apparatus is located above and connected to a gravel pack screen element having a longitudinal bore therethrough and the apparatus is located below and connected to a packer element having a longitudinal bore therethrough and the packer element is connected to a tubing string having a longitudinal bore therethrough, and the packer element is inserted inside a wellbore, and wherein an annular space is formed between the tubing and the wellbore.

29. The apparatus of claim 28, wherein when the first sleeve is in the upper position, and the second sleeve is in the lower position, the first lateral passageway is aligned with the lateral port and communication is established between the longitudinal bore of the housing above the second sleeve and the exterior of the housing through the lateral port, and communication is established between the longitudinal bore of the housing below the second sleeve and the annular space above the packer element through the first flow passage.

30. The apparatus of claim 29, wherein when the first sleeve is in the lower position, the second lateral passageway is aligned with the second flow passage and communication is established between the longitudinal bore of the housing above the sleeves and the longitudinal bore of the housing below the sleeves through the second flow passage, and communication between the longitudinal bore of the housing and the exterior of the housing through the lateral port is prevented by the first sleeve, and communication between the longitudinal bore of the housing and the annular space above the packer through the first flow passage is prevented by the first sleeve.

31. An apparatus comprising:
a cylindrical housing having an exterior and a longitudinal bore extending therethrough;
a lateral port communicating between the housing longitudinal bore and the exterior of the housing;
a first sleeve disposed within the housing longitudinal bore and having a cylindrical wall and a longitudinal passageway therethrough, capable of being positioned in an upper position and a lower position relative to the housing;
first and second lateral passageways extending through the wall of the first sleeve;

a second sleeve disposed within the first sleeve and having a longitudinal passageway therethrough and capable of being positioned in an upper position and a lower position relative to the first sleeve;

a third sleeve disposed within the first sleeve and having a longitudinal passageway therethrough and capable of being positioned in an upper position and a lower position relative to the first sleeve;

a first flow passage extending longitudinally through the housing; and a second flow passage extending longitudinally through the housing;

wherein when the first sleeve is in the upper position, and the second sleeve is in the lower position, communication is established between the longitudinal bore of the housing above the second sleeve and the exterior of the housing, and communication is established between the longitudinal bore of the housing below the second sleeve and the first flow passage;

wherein when the first sleeve is in the lower position and the third sleeve is in its lower position, communication is established between the longitudinal bore of the housing above the third sleeve and the second flow passage.

32. The apparatus of claim 31, wherein when the third sleeve is in its upper position, communication is restricted through the second lateral passageway.

33. The apparatus of claim 32, wherein when the third sleeve is in its lower position, communication is possible through the second lateral passageway.

34. The apparatus of claim 31, wherein the second and third sleeves comprise ball seating elements.

35. The apparatus of claim 31, wherein the third sleeve is in sliding contact with the first sleeve.

36. The apparatus of claim 33, wherein the first and third sleeves are releasably secured in their upper positions with at least one retaining element.

37. The apparatus of claim 34, wherein the ball seating element of the second sleeve has a smaller diameter than the ball seating element of the third sleeve.

38. The apparatus of claim 31, wherein when the first sleeve is in the upper position, and the second sleeve is in the upper position, the second sleeve prevents communication between the longitudinal bore of the housing and the first lateral passageway.

39. The apparatus of claim 34, further comprising a first ball that is sized so as to pass through the third sleeve and to seat within the second sleeve, and a second ball that is sized so as to seat within the third sleeve.

40. The apparatus of claim 39, wherein when the first sleeve is in the upper position, and the first ball is seated within the second sleeve, the first ball forms a primary seal that restricts communication between the longitudinal bore of the housing above the second sleeve and the longitudinal bore of the housing below the second sleeve.

41. A circulation tool comprising:
a housing having a longitudinal bore therethrough, a wall, and at least one lateral port through the housing wall;
at least two sliding sleeves;
at least one flow passage within the housing wall;
wherein a plurality of circulation paths are created by the selective positioning of the at least two sliding sleeves;
wherein the at least two sliding sleeves comprise a first sleeve movable between an upper position and a lower position, and a second sleeve movable between an upper position and a lower position;

wherein when the first and second sleeve are in their upper position, fluid communication is established through the longitudinal bore of the tool and restricted through the at least one lateral port through the housing wall, creating a standard circulation path;

wherein the second sleeve is capable of being shifted into its lower position independent of the movement of the first sleeve;

wherein when the second sleeve is in its lower position and the first sleeve is in its upper position, fluid communication is established between the longitudinal bore of the housing above the second sleeve and the at least one lateral port through the housing wall, and fluid communication is established between the longitudinal bore of the housing below the second sleeve and one of the at least one flow passage within the housing wall, creating a gravel pack circulation path;

wherein when the second sleeve is in its lower position and the first sleeve is in its lower position, fluid communication is restricted between the longitudinal bore of the housing above the first sleeve and the at least one lateral port through the housing wall, fluid communication is established between the longitudinal bore of the housing above the first sleeve and one of the at least one flow passage within the housing wall, and fluid communication is established between the longitudinal bore of the housing below the second sleeve and one of the at least one flow passage within the housing wall, creating a modified standard circulation path.

42. A method of completing a subterranean well that comprises tubing and an annulus between the wellbore and the tubing, the method comprising:
providing a device comprising:
a cylindrical housing having an exterior and a longitudinal bore extending therethrough;
a lateral port communicating between the housing longitudinal bore and the exterior of the housing;
a first sleeve disposed within the housing longitudinal bore and having a cylindrical wall and a longitudinal passageway therethrough, capable of being positioned in an upper position and a lower position relative to the housing;
first and second lateral passageways extending through the wall of the first sleeve;
a second sleeve disposed within the first sleeve and having a longitudinal passageway therethrough and capable of being positioned in an upper position and a lower position relative to the first sleeve;
a first flow passage extending longitudinally through the housing; and
a second flow passage extending longitudinally through the housing;
wherein when the first sleeve is in the upper position, and the second sleeve is in the lower position, communication is established between the longitudinal bore of the housing above the second sleeve and the exterior of the housing, and communication is established between the longitudinal bore of the housing below the second sleeve and the first flow passage;
wherein when the first sleeve is in the lower position, communication is established between the longitudinal bore of the housing above the first sleeve and the second flow passage;
positioning the device within a wellbore wherein the first sleeve is in the upper position and the second sleeve is in the upper position;

reconfiguring the device so that the second sleeve is in the lower position, allowing communication between the longitudinal bore of the housing and the exterior of the housing;

reconfiguring the device so that the first sleeve is in the lower position, allowing circulation through the tubing and device and up the tubing/wellbore annulus.

43. The method of claim 42, wherein a first ball is used to reposition the second sleeve from the upper position to the lower position.

44. The method of claim 43, wherein a second ball is used to reposition the first sleeve from the upper position to the lower position.

45. The method of claim 44, wherein the method further comprising:

attaching a gravel pack screen assembly below the device and a packer element above the device prior to positioning the device within the wellbore;

flowing a gravel laden slurry through the lateral port when the first sleeve is in the upper position and the second sleeve is in the lower position thereby depositing the gravel in the annulus adjacent the gravel pack screen assembly;

releasing the device from the gravel pack screen assembly after the gravel laden slurry is placed; and circulating the wellbore through the tubing and the device after the first sleeve is in the lower position to place fluids at desired locations within the wellbore.

46. A wellbore completion method comprising:

providing a circulation tool comprising:

a housing having a longitudinal bore therethrough, a wall, and a lateral port through the housing wall;

at least two sliding sleeves;

at least one flow passage within the housing wall; and wherein a plurality of circulation paths are created by the selective positioning of the at least two sliding sleeves;

positioning the tool within the wellbore, thereby creating a tool-wellbore annulus, the tool configured to provide a first circulation path, the first circulation path being through the tool and the tool-wellbore annulus;

reconfiguring the tool to provide circulation through the lateral port to provide a second circulation path;

reconfiguring the tool to seal off the lateral port and provide a third circulation path through the tool and the tool-wellbore annulus; and wherein the tool is reconfigured from the first circulation path to the second circulation path utilizing a first ball and from the second circulation path to the third circulation path utilizing a second ball, the balls sized to seat within the sliding sleeves.

* * * * *